Jan. 4, 1944. M. DE FALCO 2,338,413
CHANGE SPEED GEAR
Filed Aug. 26, 1939 6 Sheets-Sheet 1

Jan. 4, 1944.　　M. DE FALCO　　2,338,413
CHANGE SPEED GEAR
Filed Aug. 26, 1939　　6 Sheets-Sheet 4

Inventor:
M. de Falco
By E. F. Wenderoth
Atty

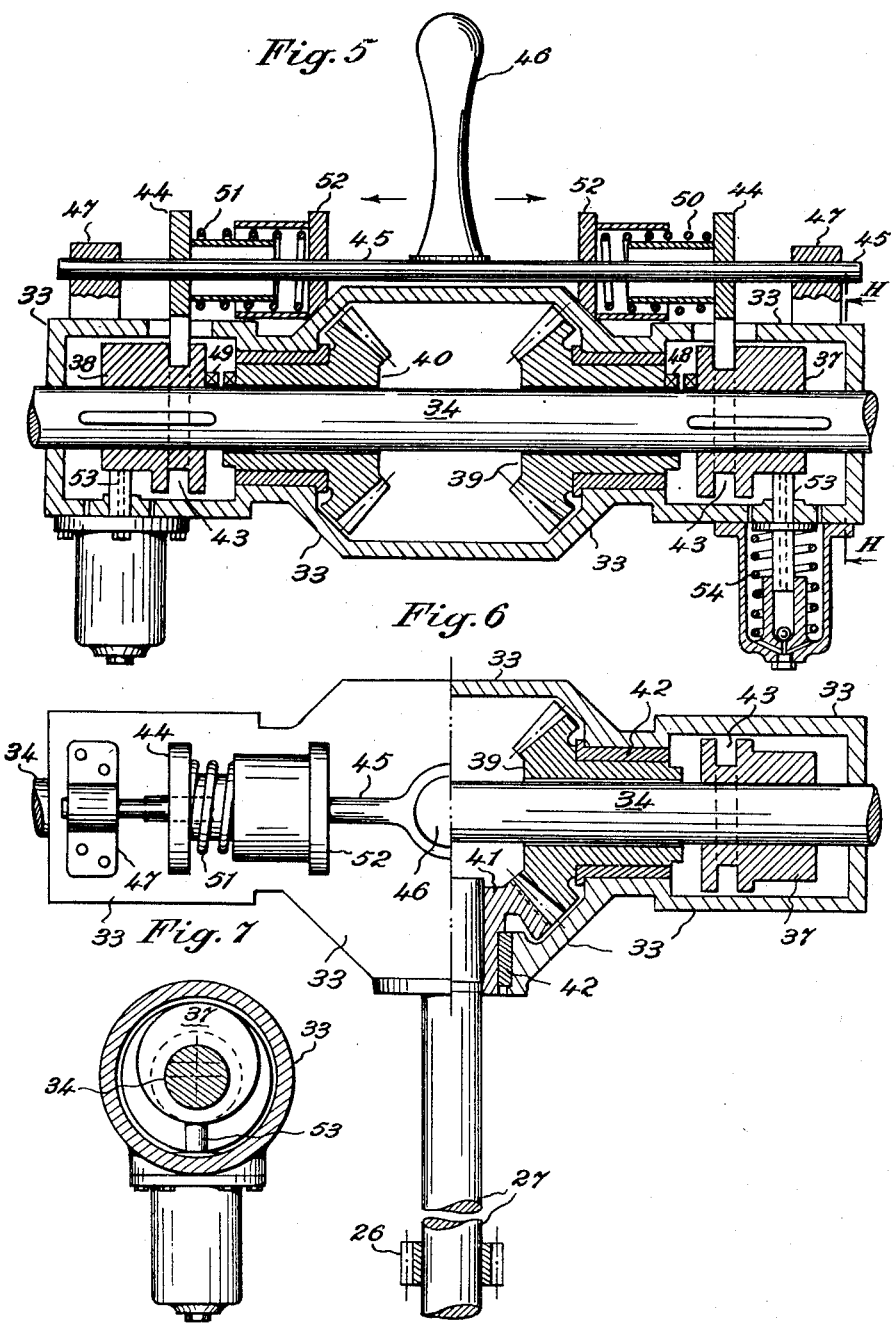

Jan. 4, 1944.   M. DE FALCO   2,338,413
CHANGE SPEED GEAR
Filed Aug. 26, 1939   6 Sheets-Sheet 6

Inventor
Mario De Falco by AMHolcombe
Attorney

Patented Jan. 4, 1944

2,338,413

UNITED STATES PATENT OFFICE 2,338,413

CHANGE-SPEED GEAR

Mario de Falco, Rome, Italy; vested in the Alien Property Custodian

Application August 26, 1939, Serial No. 292,126
In Italy September 10, 1938

8 Claims. (Cl. 74—279)

The present invention relates to a change speed gear controlled by servomotors for the sequence of drives.

The invention is illustrated in the accompanying drawings in which:

Figures 2, 3, 4, 5, 6, 7, 8 and 9 illustrate some details;

Figure 1:
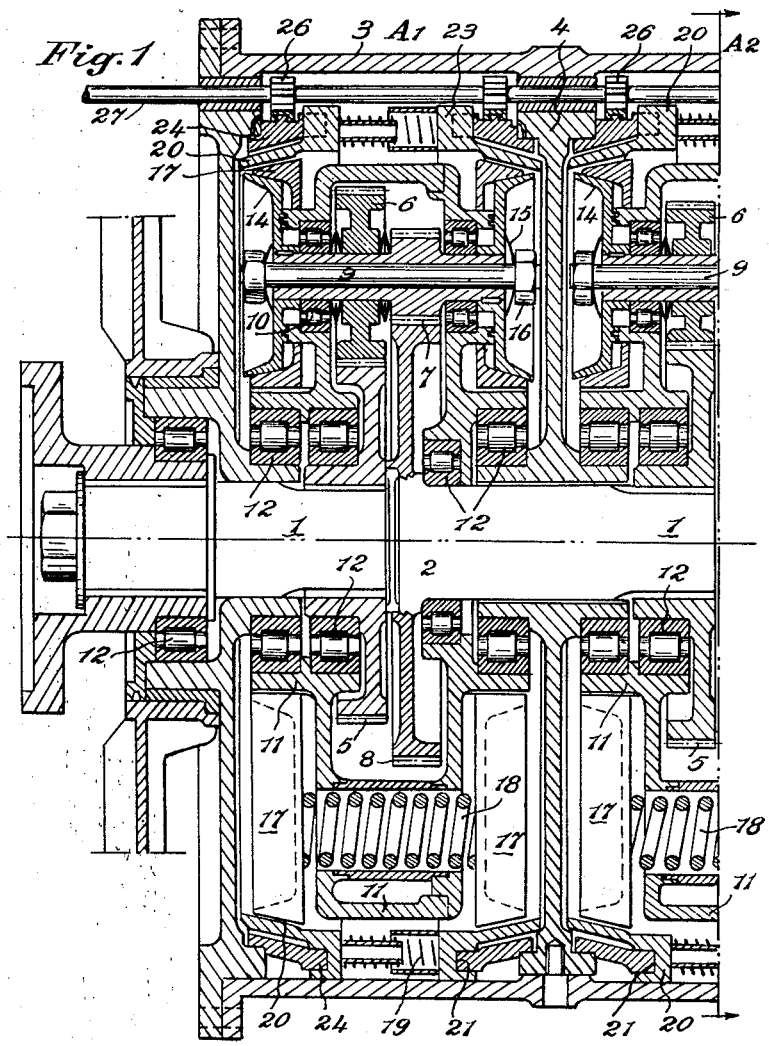
Fig. 1 shows the change speed gear in longitudinal section.
Figure 1A:
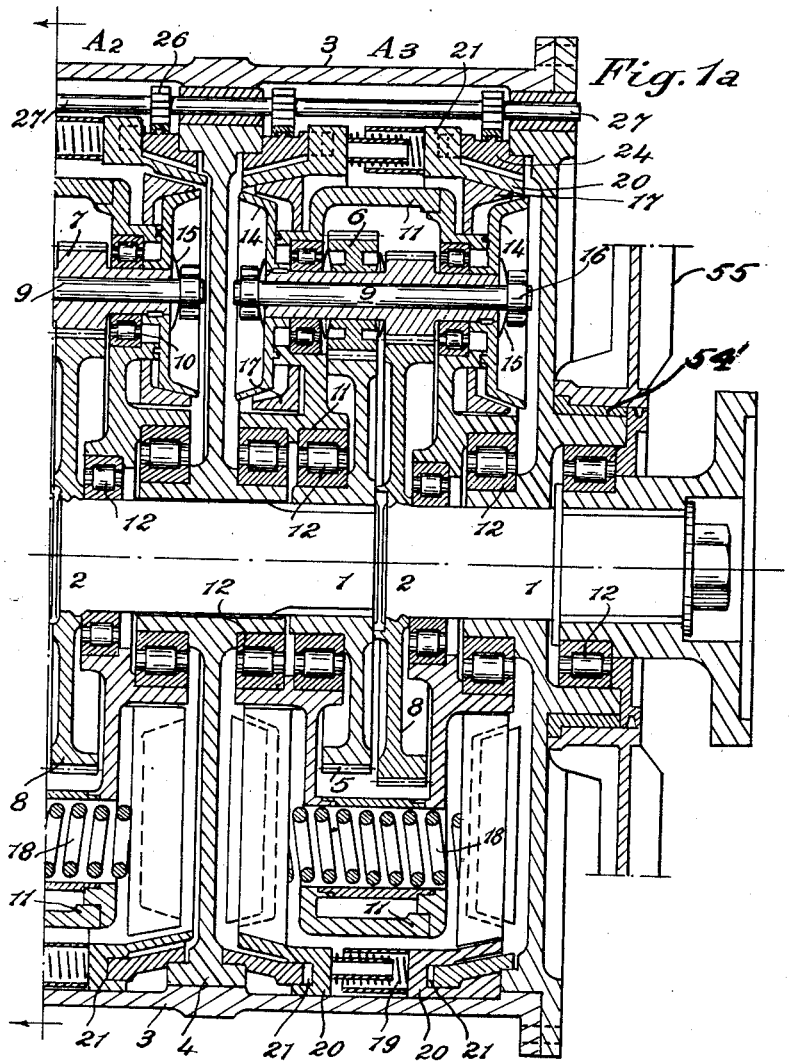
Fig. 1a is a continuation to the right of Fig. 1.
Figure 2:
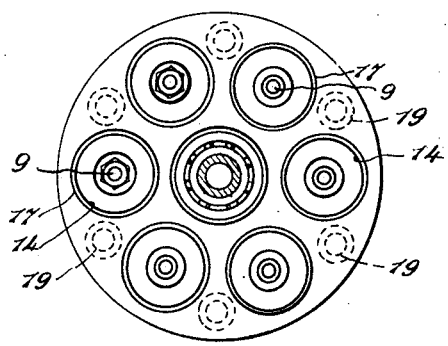
Figure 3:
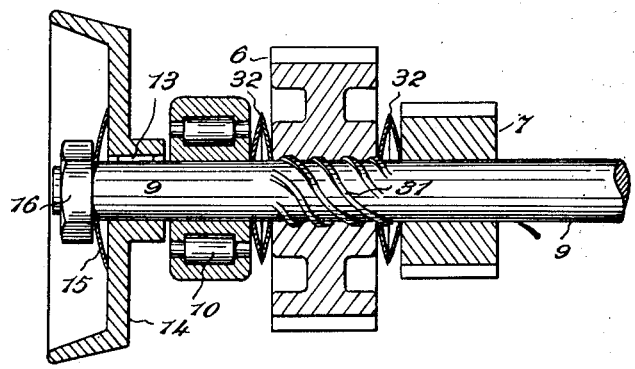

The device comprises two or more similar, ciaxial change elements $A_1 A_2 A_3$ . . . mounted in series in such a way that the driven axle of the first functions as a driving axle of the second and so on, all being enclosed in a general casing 3 divided into as many compartments as the number of elements by means of partitions 4 integral with the casing.

Each element A consists of a driving shaft 1 and a driven shaft 2, both coaxial, transmitting the motion to one another by means of the gears 5, 6, 7 and 8. Gear 5 is fixed to the driving shaft 1, gear 8 to the driven shaft 2 and gears 6 and 7 are fixed to countershafts 9. These countershafts are two or more in number, symmetrical with respect to the main shafts and with their own axes parallel to the central axis of the change speed gear and their bearings 10 located in a drum 11, this drum being in its turn free to rotate around the main shafts 1 and 2 by means of bearings 12.

On both ends of each countershaft there are mounted two friction disks 14, which by means of keys 13 are obliged to turn with the countershaft, but they may be submitted to small axial displacements and normally they are urged against the disks 17 by springs 15 and regulating nuts 16. The large disks 17 rotate with the drum 11, but, conveniently guided, they may be axially displaced with respect to drum 11. The outside rim of the disks 17 presents a conical friction surface, the axis of which coincides with the central axis of the change gear and the outside wall of the same disks 17 is provided with as many conical friction surfaces coaxial with the countershafts as there are respective friction disks 14. The springs 18 freely crossing the drum 11 normally push the disks 17 against the disks 14 securing thus the contact of the relative friction surfaces with such a pressure as to brake and prevent the movement of the countershafts 9 with respect to the drum 11.

Figure 4:
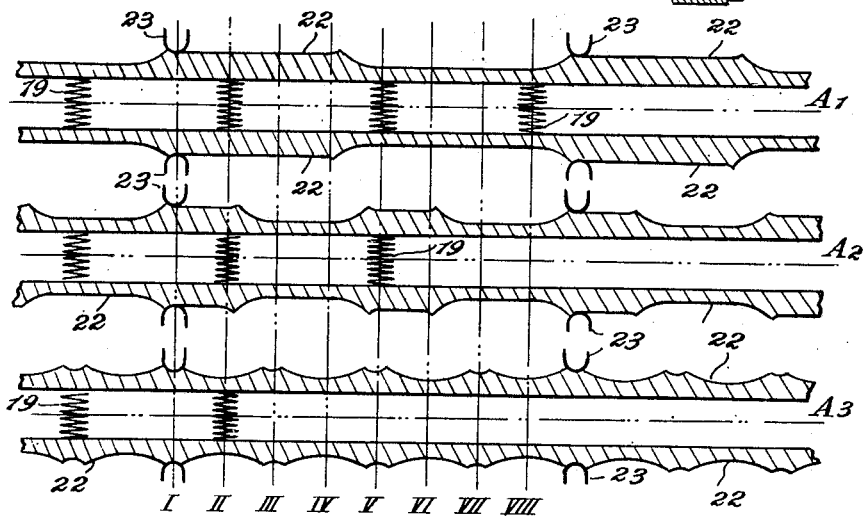
Figure 11:
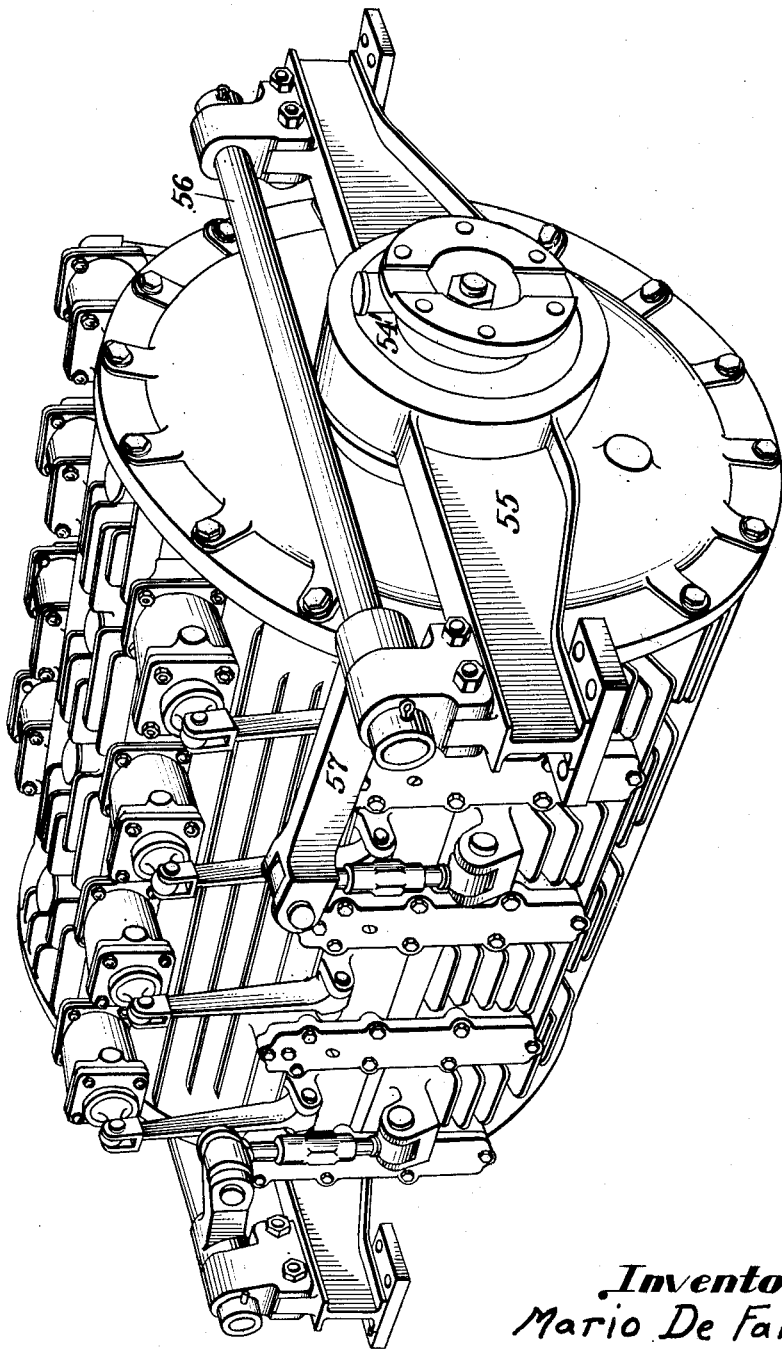
Fig. 11 is a perspective view of the change speed gear box.

Two more drums 20 coaxial with the central axis of the change gear, conveniently guided, may be displaced in axial direction, but they cannot turn and are normally kept spaced by springs 19. Said drums 20 are provided towards their inside with a conical friction surface arranged in such a way as to come into contact with the outside surface of the disks 17 when the drums 20 approach one another as further on explained. In this case the drums 20 force the disks 17 to set free the disks 14 and allow them to turn freely while they remain blocked owing to the friction between 17 and 20. In the crown of each drum there is provided a circular groove 21 with projections 22 of a convenient length on the bottom. Fig. 4 shows the section of the bottom wall of said groove with relative projections and depressions developed for clearness sake on the plane.

Two rings 24, also coaxial with the central shafts of the change gear, and each provided on the periphery with a toothed sector 25, may rotate in one direction or the other for a maximum angle determined by the length of the toothed sector by means of a pinion 26 engaging the said sector and keyed on the shaft 27 connected to a servomotor. Each ring 24 is usually provided with three projections 23 sliding on the bottom of the groove 21, the contact being kept owing to the action of the springs 19. The toothed sector 25 instead of being integral with ring 24 may be subjected to small displacements by sliding along the guide 28, while said sliding is opposed by the pull of springs 29 acting on projections 30 provided on ring 24.

It is to be remarked that in each element of the change gear, with the object of securing the uniform distribution of the load among the different transmission countershafts 9, there is provided an automatic adjusting device formed by mounting on each countershaft one at least of the planetary pinions 6 by means of helicoidal keys 31 conveniently inclined between a couple of springs 32 opposing the axial displacement of the pinion caused by the torsional strain. Object of this is to obtain through rotation the yielding of the pinion in order to avoid the overloading of the tooth due to imperfections of mounting by transmitting it proportionally on the teeth of the pinions of the other countershafts.

Figure 10:
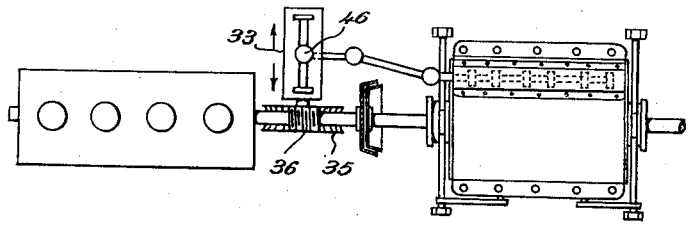
Fig. 10 is a schematic view of the whole.
Figure 8:
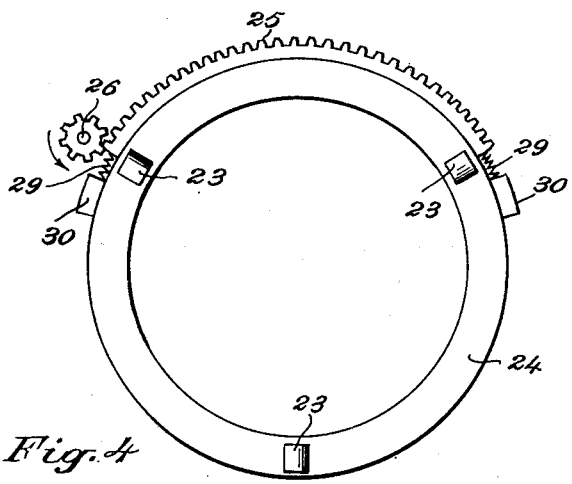
Figure 9:
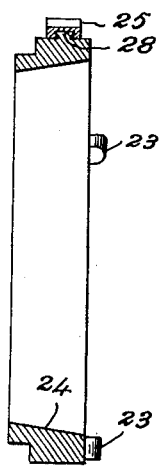

The servomotor for controlling the change gear is illustrated in one of its possible forms of realisation in figures 5 and 6 and substantially comprises a fixed casing 33 traversed by a shaft 34 whose slow motion of rotation is derived from the driving shaft in any desired way, for instance by means of a worm gear 35, 36 as shown in Fig. 10. On the shaft 34 there are mounted the two cams 37, 38 turning with shaft 34 by means of the relative keys, but they may be displaced axially on the same shaft. The two conical pinions 39, 40 are freely mounted on the shaft 34, and said pinions permanently engage a third conical pinion 41 fixed to the end of the manoeuvring shaft 27 of the change gear. Suitable bearings 42 are interposed between the hubs of the pinions and casing 33.

The cams by being displaced axially may clutch the respective conical pinions by means of the toothed couplings 48, 49. The axial displacements of the cams 37, 38 are obtained by means of the two fork plates 44 cooperating with the circular groove 43 and the plates 44 are fixed to the manoeuvring rod 45, which, by means of the handle 46 may be caused to slide forward or backward in the supports 47 fixed to the casing 33.

The plates 44 and consequently the rod 45, owing to the effect of the balanced springs 50, 51, which react against the fixed walls 52, are normally kept in an intermediary position of rest, in which, as the toothed couplings 48, 49 are both open, the conical pinions and consequently the manoeuvring shaft 27 remain in position of rest.

The displacement of the rod 45 by means of the handle 46 in one direction or the other of the shaft 34 produces either the closing of the toothed coupling 48, while coupling 49 remains open, or the closing of coupling 49 while the coupling 48 remains open, with consequent rotation to the right or left of the shaft 27 and consequently of all the pinions 26 and then a determined angular displacement of the rings 24 for each turn of the shaft 27 is obtained. When the handle 46 is released, the manoeuvring rod owing to the more compressed spring 50 or 51 is in condition to automatically return into the position of rest.

Cooperating with the two cams 37, 38 are two latches 53, pushed by the springs 54, constituting thus a special blocking device. In fact the stroke of said latches or bolts is a little smaller than the eccentricity of the cams 37, 38, and the latches are subjected to a reciprocating motion during the rotation of the cams, whenever these cams present to the ends of the latches their cylindrical surface. If, while the cams rotate, one of them is sufficiently displaced so as to contact the end of the latch, this latch will prevent the cam from returning to the starting position during nearly its total turn, a short zone of eccentricity being excepted in correspondence of which the return is possible. On the other hand the sufficient displacement of the cam cannot be realised if its coupling tooth is not in correspondence with the coupling cavity of the respective conical pinion. The consequence is that by pressing the controlling handle 46, this handle is not sufficiently displaced till the coupling tooth is entered into the corresponding cavity. When the displacement is at an end the release of the handle 46 does not directly produce the return of the cam and consequently the uncoupling, as meanwhile said cam in rotating has pressed the latch into the zone with an eccentricity greater than the minimum, but it may return backwards under the action of the spring 50 or 51 only when a turn of the cam is entirely completed, that is the return of the cam and the consequent uncoupling take place only for a determined angular position of the cam and of the shaft 34 and obviously also the couplings can only occur in that same angular position of the cam and consequently of the shaft.

When it is desired to repeat the coupling two or more times during a cycle of the cam it is obvious that it will be sufficient to provide the cam with two or more teeth and with two or more zones of minimum eccentricity.

This combined device permits obtaining always regular manoeuvres without the necessity of the particular attention of the driver during the duration of the manoeuvre since the exact duration is synchronically obtained in a cycle of the coupling-cam-latch system. In other words the servomotor acts as a preselection or controlling device, the control being able to retard the preselection almost during a cycle of the cam. At the same time the device prevents a manoeuvre already started from remaining incomplete.

The whole servomotor has then the object to avoid hydraulic, pneumatic or electric installations, when they are required for other reasons; it is obvious that, should these reasons exist, said servomotor may be replaced by others of an already known type.

The functioning of the change speed gear occurs as follows and only for clearness sake it is referred to the case illustrated in the accompanying drawings of a change gear comprising the elements $A_1 A_2 A_3$.

Each element of the change gear has two possibilities of drive, differentially and direct. The differential running is obtained when the protruding parts 23 of the rings 24 being in correspondence with the projections 22 of the grooves 21 keep the drums axially approached to one another and consequently couples 17 with 20 and uncouples 14 and 17. In this way the countershaft carrier drum 11 is obliged to stop and transmission takes place differentially through the gears 5, 6, 7, 8.

The direct drive is on the contrary obtained when the protruding parts 23 by sliding on the projections 22 owing to the rotation of the manoeuvring shaft 26 and to the angle displacement of the rings 24, happen to be in correspondence with the depressions between the subsequent projections. In this case the drums 20 owing to the action of the springs 19 are pushed towards the outside releasing the coupling between 20 and 17, while the disks 17 also pushed by the springs 18 couple 14 and 17 making the countershafts fixed to the drums 11 free to rotate on their own bearings 12. In such a way the pinions 6, 7 not being able to rotate on their own axis, operate by means of the teeth in engagement, a true direct coupling between the wheels 5 and 8 entraining in the rotation the drum 11 with a speed equal to the one of the shafts 1, 2.

By conveniently combining the two possible drives for each element of the change gear A with the one of the other elements composing the whole gear a number of drives, or speeds, may be realised much higher than the number of the elements and more exactly four drives may be realised with two elements, eight drives with three elements, sixteen drives with four elements and so on.

With reference to the case illustrated in the drawings with three elements the possible combinations are the following:

| 1st element A₁ | 2nd element A₂ | 3rd element A₃ | Speed |
|---|---|---|---|
| 1st differential drive. | Differential drive. | Differential drive. | $q^7$ |
| 2nd differential drive. | ...do... | Direct drive. | $q^6$ |
| 3rd differential drive. | Direct drive. | Differential drive. | $q^5$ |
| 4th differential drive. | ...do... | Direct drive. | $q^4$ |
| 5th direct drive. | Differential drive. | Differential drive. | $q^3$ |
| 6th direct drive. | ...do... | Direct drive. | $q^2$ |
| 7th direct drive. | Direct drive. | Differential drive. | $q^1$ |
| 8th direct drive. | ...do... | Direct drive. | $q^0=1:1$ |

If the gear ratios of the three elements are in proportion to one another as $q^4:q^2:q^1$ the eight general drives will have the values indicated in the last column of the preceding table.

The servomotor, as mentioned, by setting in rotation the driving shaft 27, secures by means of the pinions 26 and toothed sectors 25 the simultaneous and equal angular displacement of all the rings 24 and consequently of the relative protruding parts 23. It will then be sufficient to conveniently dispose the shape of the grooves 21, that is lengths of projections and depressions, so that at the end of each angular displacement of the rings 24 the protruding parts 23 are found in each single change element either in correspondence with the projections (differential drive) or in correspondence with the depressions (direct drive) according to the preestablished order.

Fig. 4 shows by way of example the shape of the three couples of rings 24 in a change gear of three elements in order to obtain the combinations reported in the preceding table and the disposition of the protruding parts 23 at the end of the eight angular displacements which realise the eight drives indicated by Roman numbers I, II, III, IV, V, VI, VII and VIII.

It is evident that the passage from one drive to the other takes place in one direction or the other always, however, according to the preestablished order, that is by passing from one drive to another without passing through the intermediary one. It is furthermore evident that the toothed sector being strictly limited to the total angular displacement, this being the sum of the single displacements necessary for the maximum number of the drives allowed, it is not possible to effect further displacements beyond the extreme drives when ever through inadvertence or other causes the manoeuvring handle on the servomotor should be still in a working position.

The passage from one drive to the other is effected as follows:

The handle 46 of the servomotor is pushed in the desired direction until the coupling of the cam tooth and an instant afterwards the handle is released. The control is produced during the rotation of the cam 37 or 38 which will be released from its own pinion only when the manoeuvre is over. Should subsequent controls for sharp accelerations or retardations be wanted the handle is kept displaced till the wanted speed is obtained.

The servomotor simplifies the control even when this control should take place at a distance as in the case of railway driving machines running in double traction. In fact in this case only the control in one direction or in the other is allowed in order to obtain any speed whatever and the repetition of the same control is allowed to pass to subsequent speeds instead of effecting successive controls through successive circuits.

The advantages obtained by employing the speed control above specified and which make it especially suitable for high powers may be summed up as follows:

(a) Gears always engaged, (b) Subdivision of the effort to be transmitted on multiple countershafts with evident economy of material, greater balance and duration especially for high powers, (c) Possibility of arranging the bearings very near to the gears, (d) Absence of epicycloidal and hypocycloidal movements during power transmission, (e) No interruption of driving power during the working of the change gear, (f) Possibility of obtaining with few change elements many degrees of speed.

Having now particularly described and ascertained the nature of my said invention and in what manner the same is to be performed, I declare that what I claim is:

1. In a change speed mechanism the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a non-rotatable braking element, a braking element mounted on said countershaft and a braking element on said drum having two friction surfaces to cooperate either with said non-rotatable braking element or said braking element on said countershaft.

2. In a change speed mechanism, the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a non-rotatable braking element, a braking element mounted on said countershaft, a braking element on said drum having two friction surfaces to cooperate either with said non-rotatable braking element or said braking element on said countershaft and means for displacing said braking element on said drum along the axis of said drive shaft.

3. In a change speed mechanism, the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a pair of spaced non-rotatable braking elements, a pair of spaced braking elements mounted on the ends of said countershaft and a pair of braking elements on said drum each having two friction surfaces selectively with said first mentioned braking elements.

4. In a change speed mechanism, the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a pair of spaced non-rotatable braking elements, a pair of spaced braking elements mounted on the ends of said countershaft, a pair of braking elements on said drum each having two friction surfaces cooperating selectively with said first mentioned braking elements and springs normally urging said braking elements on said drum into contact with said braking elements on said countershaft to prevent movement of said countershaft relative to said drum.

5. In a change speed mechanism, the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a pair of spaced non-rotatable braking elements, a pair of spaced braking elements mounted on the ends of said countershaft, a pair of braking elements on said drum having two friction surfaces cooperating selectively with said first mentioned braking elements, springs normally urging said braking elements on said drum into contact with said braking elements on said countershaft to prevent movement of said countershaft relative to said drum and means for moving said non-rotatable braking elements axially so as to contact said braking elements on said drum and release said last named elements from the braking elements on said countershaft.

6. In a change speed mechanism the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a non-rotatable braking element, a braking element mounted on said countershaft, a braking element on said drum having two friction surfaces to cooperate either with said non-rotatable braking element or said braking element on said countershaft, and a rotatable ring having a groove therein in which said non-rotatable braking element may be guided for a limited movement parallel to the axis of said drive shaft.

7. In a change speed mechanism the combination of a drive shaft, a driven shaft coaxial with said drive shaft, gears carried by said shafts, a drum freely rotatable about said shafts, a countershaft mounted in said drum, planet gears on said countershaft meshing with said first mentioned gears, a non-rotatable braking element, a braking element mounted on said countershaft, a braking element on said drum having two friction surfaces to cooperate either with said non-rotatable braking element or said braking element on said countershaft, a rotary ring having a groove therein in which said non-rotatable braking element is guided, a rack upon said rotary ring, cam elements located in said groove coacting with said non-rotatable braking element and a pinion coacting with said ring for moving said rotary ring whereby said cam elements will impart an axial movement to the said non-rotatable braking element.

8. In a change speed mechanism the combination of a drive shaft, a driven shaft coaxial with said drive shaft, gears carried by said shafts, a drum freely rotatable about said shafts, a countershaft mounted in said drum, planet gears on said countershaft meshing with said first mention gears, a non-rotatable braking element, a braking element mounted on said countershaft, a braking element on said drum having two friction surfaces to cooperate either with said non-rotatable braking element or said braking element on said countershaft, a rotary ring having a groove therein in which said non-rotatable braking element is guided, a rack upon said rotary ring cam elements located in said groove coacting with said non-rotatable braking element, a pinion coacting with said ring for moving said rotary ring whereby said cam elements will impart an axial movement to the said non-rotatable braking element, a single transmission shaft for said gear, a cam and a latch cooperating therewith so that engagement and disengagement is possible only with a whole number of rotations.

MARIO DE FALCO.